Oct. 19, 1943.  E. VAN DER PYL  2,332,281

SANDBLAST NOZZLE

Filed Dec. 12, 1940

Inventor
EDWARD VAN DER PYL

By George C. [signature]
Attorney

Patented Oct. 19, 1943

2,332,281

UNITED STATES PATENT OFFICE 2,332,281

SANDBLAST NOZZLE

Edward Van der Pyl, Holden, Mass., assignor to Norton Company, Worcester, Mass., a corporation of Massachusetts Application December 12, 1940, Serial No. 369,785

4 Claims. (Cl. 51—11)

The invention relates to sandblast nozzles.

One object of the invention is to provide a sandblast nozzle of great durability. Another object of the invention is to provide a sandblast nozzle of such construction that the part taking the wear may be of very simple shape. Another object of the invention is to provide a sandblast nozzle including a wearable part made of boron carbide which is of such simple shape as to be readily molded without great expense. Other objects will be in part obvious or in part pointed out hereinafter.

The invention accordingly consists in the features of construction, combinations of elements and arrangements of parts, as will be exemplified in the structure to be hereinafter described, and the scope of the application of which will be indicated in the following claims.

In the accompanying drawing showing one of many possible embodiments of the mechanical features of this invention.

Figure 1:
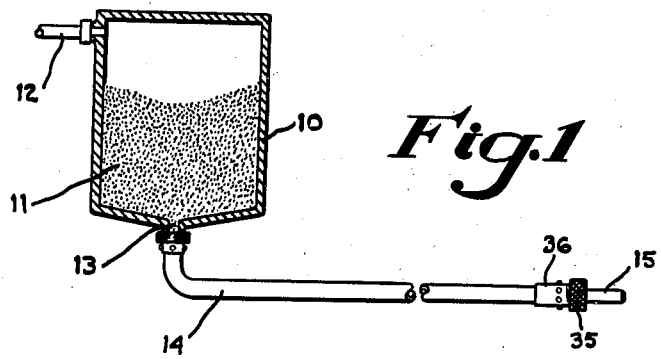
Figure 1 is a schematic view illustrating the use of sandblasting equipment.

Sandblast equipment may comprise a tank 10 containing suitable abrasive 11 and connected by a pipe 12 to a source of air under pressure. At the bottom of the tank 10 is an orifice 13 through which the "sand" which may be silica or aluminum oxide or silicon carbide or other hard materials escapes into a flexible hose 14 upon the end of which is the nozzle 15 which is the subject matter of this invention.

Figure 3:
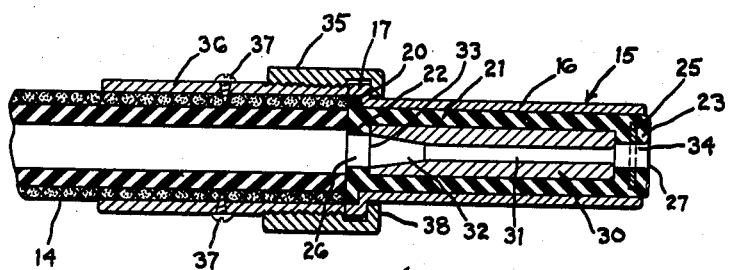
Figure 3 is an axial sectional view through the nozzle of the invention attached to the end of a sandblast hose.
Figure 2:
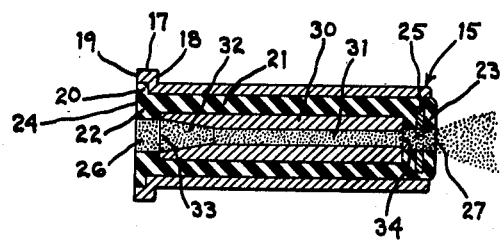
Figure 2 is an axial sectional view through the nozzle of the invention.

Referring to Figures 2 and 3, the nozzle comprises a steel sleeve 16 having an enlarged diameter portion 17 at one end, leaving a square shoulder 18 facing opposite to the annular end wall 19. Inside of the enlarged diameter portion 17 is a flange 20 of a rubber sleeve 21. The rubber sleeve 21 likewise has a thick inwardly extending flange 22 inside of the flange 20 and a thick inwardly extending flange 23 at the other end of the sleeve. The flanges 20 and 22 have a common annular plane surface 24. In the flange 23 is a steel washer 25.

The flanges 23 and 22 together with the inside of the sleeve 21 define a hollow right circular cylindrical space leaving, however, central holes at the ends thereof. That is to say, there is a cylindrical bore 26 in the flange 22 and a cylindrical bore 27 in the flange 23 and these bores are coaxial with each other and with the sleeve 21. The bore 26 is somewhat larger than the bore 27.

In the cylindrical space just defined is a nozzle liner 30 of very hard material. Geometrically this liner 30 is a right circular cylinder with a coaxial right circular cylindrical bore 31 merging into a frusto-conical bore 32 which ends with one end of the liner 30. The orifice 33 of the liner 30 which bounds the frusto-conical bore 32 is of the same diameter as the orifice 26 in the flange 22 of the rubber sleeve 21. The orifice 34 bounding the outside end of the cylindrical bore 31 is slightly smaller in diameter than the diameter of the orifice 27 in the flange 23 of the rubber sleeve 21. The orifice 34 may be bellmouthed to a minute extent as shown in the drawing.

The nozzle 15 is attached to the end of the hose 14 by means of a union 35 which is internally threaded and may be screwed onto an externally threaded sleeve 36 fitting the outside of the hose 14 and held thereto as by means of screws 37. The union 35 has an inwardly extending flange 38 which engages the shoulder 18. By tightening the union 35, the nozzle 15 can be firmly attached to the hose 14 coaxial with it, as shown.

It is a remarkable property of rubber that it can resist wear due to particles striking it normal to its surface for a long period of useful life. Also, it resists erosion of particles traveling parallel to its surface provided the velocity is not too great. Of course, the rubber sleeve 21 can be replaced from time to time and is not very expensive. The high velocity of the abrasive particles is derived from their traveling through the restricted small diameter bore 31 of the boron carbide liner 30. Boron carbide ($B_4C$) is a very hard substance and a nozzle liner made of boron carbide will outlast many similar liners made of steel or any metal. Accordingly, the nozzle of the invention imparts high velocity to the abrasive particles issuing therefrom and yet has a long life.

A feature of importance in the invention is the provision of a nozzle liner 30 of relatively simple shape. The outside diameter is uniform; the outside surface is truly cylindrical without any break whatsoever. Boron carbide in the form of small particles may be molded under heat and pressure into an integral piece. At a temperature just under the fusing point of boron carbide and under considerable pressure, the particles of boron carbide coalesce to form a body of great density. Thus the liner 30 is substantially pure boron carbide as the particles thereof are self-bonded to each other. The molding is done in a graphite tube with graphite plungers and in the tube is a graphite mold having small plungers in its end. The bores may be formed with a graphite plug. Apparatus for molding boron carbide to the shape shown is disclosed in U. S. Letters Patent No. 2,125,588 to Raymond R. Ridgway granted August 2, 1938. This apparatus can function efficiently to make massive pieces of boron carbide but it is very difficult to make complicated shapes. In the liner shown, all the surfaces, inside and outside, are surfaces of revolution excepting the ends which are planes. Consequently the mold plungers can operate most efficiently to give the desired pressure without cracking the mold itself. The absence of external flanges or indentations and the like greatly simplifies the molding and renders it unnecessary to grind away the boron carbide at any point. It is most difficult to grind a piece of molded boron carbide, in fact it can hardly be done without a diamond grinding wheel. However, the slight bell-mouth at the orifice 24 can readily be formed with a small diamond grinding wheel since the amount of material to be removed is very slight.

The boron carbide liner 30 is held in position in the nozzle 15 by the rubber sleeve 20. That is to say, the flange 23 holds the liner 30 in place against the thrust of the blast which would tend to blow it out of the assembly. For that reason the washer 25 is provided which reinforces the flange 23. Owing to this construction I am enabled to dispense with a flare, a flange or an enlarged portion on the exterior surface of the liner 30. It is this combination of features which permits the use of the simple cylindrical boron carbide liner shown. The invention may likewise be embodied in nozzles having a liner of other hard material although molded boron carbide is the best material known to me for the purpose.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. A nozzle for sandblast apparatus comprising a liner of hard material having a cylindrical outer surface unmodified by flanges or recesses and having a bore therethrough which is a surface of revolution, said liner being peripherally encompassed by a rubber sleeve having two inwardly extending flanges one at each end for respectively overlying the two annular end faces of said liner and having an external flange at one end thereof, and a metal sleeve outside of the rubber sleeve having a portion coacting with said external flange whereby to clamp the nozzle to a hose, the hard liner being held against relative axial movement by the inwardly extending rubber flanges, the hard liner constituting a simple geometrical piece which can be readily molded.

2. A nozzle for sandblast apparatus comprising a liner of hard material having a cylindrical outer surface unmodified by flanges or recesses and having a bore therethrough which is a surface of revolution, said liner being held in place by a rubber sleeve having an inwardly extending flange at one end and having an external flange at the other end, a sleeve of rigid material outside of the rubber sleeve and having a portion coacting with said external flange whereby to clamp the nozzle to a hose, and a washer-like element of rigid material embedded in the inwardly extending flange of the rubber sleeve, the hard liner being held in position by the inwardly extending rubber flange reinforced with said washer-like element, the latter having an aperture in line with the axis of said liner, said aperture being of a shape and size inadequate to permit passage therethrough of said liner, the hard liner constituting a simple geometrical piece which can be readily molded.

3. A nozzle for sandblast apparatus comprising a liner of hard material having a plain cylindrical outer surface and having a bore therethrough which at one end is an inlet end for sand or the like and at the other end thereof is a discharge therefor, an encasing member made of a material having the characteristics of rubber and peripherally enveloping said liner, said encasing element having an inwardly projecting flange-like portion for overlying the annular face at the discharge end of said liner and for thereby resisting movement of the liner axially in the direction of the discharge therethrough, and an apertured member of relatively rigid material embedded in said flange-like portion of said encasing element, said aperture being substantially aligned with the axis of said bore and being of a size smaller than the cross-sectional size of said liner.

4. A nozzle for sandblast apparatus comprising a liner of hard material having an outer sleeve-like casing of rigid material with an intermediate element interposed therebetween and peripherally encasing said liner, said interposed element being of a material having the yielding characteristic of rubber, means for holding said liner against axial movement relative to said interposed encasing element in a direction toward the discharge end, means coacting with said outermost encasing member for clamping the construction to and against the end of a hose or the like, said interposed encasing element having an outwardly extending flange-like portion exposed peripherally at that end of the construction remote from the discharge end and thereby exposed for yielding engagement with said end of a hose and also to become clamped and thereby anchor said interposing encasing element against axial movement toward the discharge end.

EDWARD VAN DER PYL.